Sept. 6, 1966        R. W. WAGNER        3,270,580

GEAR SHIFT LOCKING DEVICE

Filed Dec. 9, 1963        2 Sheets-Sheet 1

Sept. 6, 1966   R. W. WAGNER   3,270,580
GEAR SHIFT LOCKING DEVICE
Filed Dec. 9, 1963   2 Sheets-Sheet 2
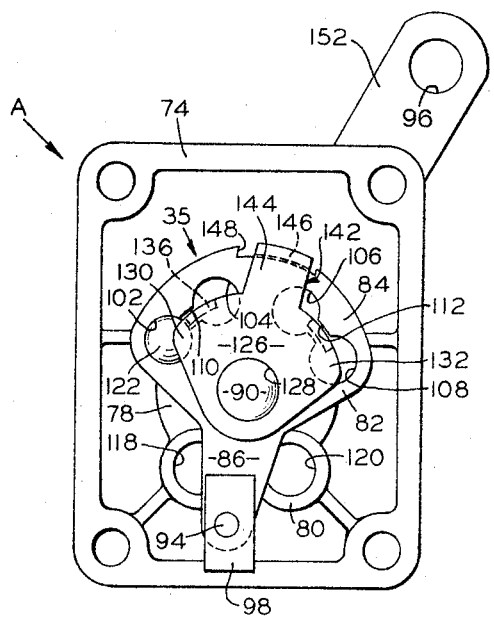
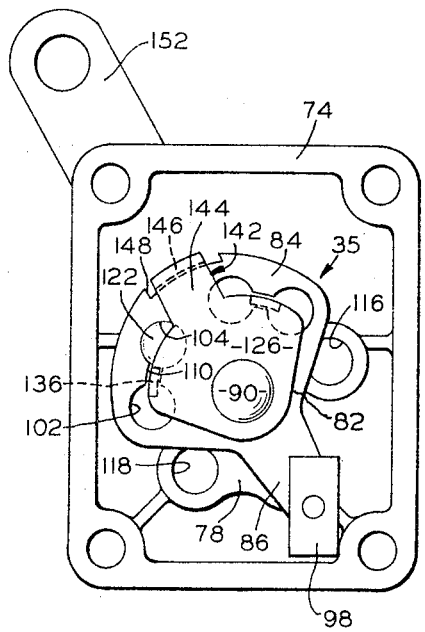
FIG. 3   FIG. 4
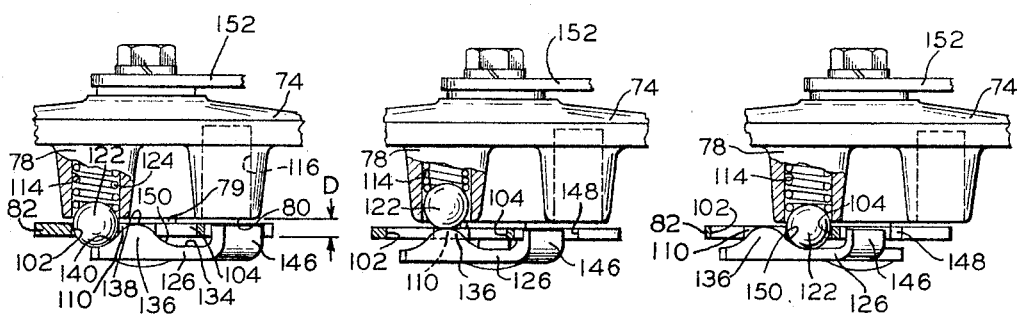
FIG. 5   FIG. 6   FIG. 7

United States Patent Office 3,270,580
Patented Sept. 6, 1966

3,270,580
GEAR SHIFT LOCKING DEVICE
Robert W. Wagner, Chelsea, Mich., assignor to Dana Corporation, Toledo, Ohio, a corporation of Virginia
Filed Dec. 9, 1963, Ser. No. 328,877
15 Claims. (Cl. 74—475)

The present invention relates in general to gear shift mechanism and is more particularly directed to an improved gear shift mechanism having a positive locking means operatively associated therewith.

This particular type of gear shift mechanism is readily adaptable for connection to a variety of sliding gear transmissions wherein a shiftable member, such as a gear or its equivalent, is disposed therein and operable for shifting between various operating positions. The primary purpose for employing a locking means in such arrangements is to prevent involuntary movement of the shiftable member under conditions other than which would occur as a result of a deliberate shifting operation. This involuntary movement is commonly referred to in the art as gear hopping and may come about as a result of undesirable vibrations presented during normal operating conditions or as torque is being transmitted between the various elements at which time the gears have a tendency to shift or walk out of mesh.

The most common form of locking means employed in present gear shift mechanisms is the spring loaded poppet. Prior devices incorporating locking means have been directed to a structure which requires less physical effort on the part of an operator in overcoming the locking means. The locking means is generally overcome by the same actuating movement which causes the shifting of the shiftable member. For this reason it is advisable to have relative movable elements in the gear shift mechanism whereby upon initial operation one of the elements is operable to overcome the locking means while further operation will permit the same element to engage another element to effect shifting of the shiftable member. Ordinarily, the locking means is carried by the transmission housing and arranged in such a manner so as to prevent movement of the gear shift mechanism while in a pre-selected position. Under these conditions the gear shift mechanism is held in a positive locked position with respect to the housing thereby preventing accidental shifting of the shiftable member of the transmission.

Prior devices accomplish this in numerous ways. One of the more common structures, for example the device shown in United States Patent No. 3,016,759, with respect to which this invention is an improvement, discloses a manually operable shift element which is adapted to be axially movable within the transmission housing and utilizes a sleeve element which is operatively connected thereto and operable to shift the shiftable gear member. In this instance the locking means is in the form of a spring loaded poppet constructed so as to have a detent portion thereon engageable with suitable indexing means on the shift element to indicate the operating positions of the gear shift mechanism, while a reduced locking shoulder is also provided thereon and is adapted to cooperate with suitable apertures in the sleeve element to form the positive locking connection. A lost motion means is provided between the elements so that during axial movement the detent portion of the poppet is initially cammed out of its indexed position in the shift element to cause the locking shoulders of the poppet to be displaced from cooperative engagement with the sleeve element thereby momentarily releasing the locking connection to effect shifting of the sleeve element.

From this it will be evident that the apertures in the sleeve and a portion of the poppet serve as the means for establishing a positively locking connection and that the cooperating elements forming the positive locking connection must be carefully constructed so as to permit satisfactory operation. Further, the device disclosed therein operates in a linear path and as a result requires considerable operating space to complete the various operations and for other structural considerations is limited in its manner of installation in and utilization with a shiftable unit.

Other devices, such as shown in United States Patent No. 2,933,928, have attempted to reduce the operating area by utilizing the principles of rotary motion with respect to some of the elements of the shifting mechanism. However, in so doing have still provided a structure in which certain elements move in a linear path and which, for other reasons is not entirely satisfactory. In such devices the rotatable shift element and the axially movable element have spaced individual mounting supports requiring a plurality of parts and excessive space.

Another disadvantage is that in translating the rotational movement of the rotatable element to linear movement of the axially movable element, a component of the force transmitted therebetween will tend to cause binding and therefore will not be available to cause shift actuation. A further drawback in these arrangements is the necessity of altering the elements in order to accomplish other than the exact designed operation.

Accordingly, it is an object of this invention to provide an improved shift mechanism having a positive locking means which utilizes rotary motion rather than linear motion.

It is another object to provide such a shift mechanism wherein the elements are rotatably mounted about a common axis thereby resulting in compact overall structure.

Another object is to provide a locking means which is engageable with one of the elements of the shift mechanism to form a positive locking connection and being operable by another of the elements to be initially overcome prior to effecting a shifting operation of said one element.

Still another object is to provide a combination gear shift mechanism and positive locking means wherein a single element of the gear shift mechanism will be capable of maintaining the locking means in its positive locked condition while being further operable to momentarily displace the same from its positive locked position and also operative to effect shifting of the shift element between its operative positions.

Yet another object of this invention is to provide such a shift mechanism wherein the unlocking movement of said single element and the shifting movement thereof occurs consecutively so that the overall force to complete the shift is reduced.

A still further object is to provide a locking means which utilizes an exceptionally light biasing force to effect a positive locking action thus substantially reducing the amount of physical effort required to overcome the locking means.

Another object is the provision of a positive locking means which will function automatically upon completion of a shift from one selected position to another to positively lock the gear shift mechanism in another of its operative positions.

Further objects and advantages will become apparent upon consideration of the following detailed description when taken in connection with the accompanying drawings wherein:

FIG. 3 is a rear elevational view of the gear shift mechanism in one of its operative positions shown removed from the power take-off unit for added clarity;

FIG. 4 is a view according to FIG. 3 with the gear shift mechansm shown in another of its operative positions;

Figure 2:
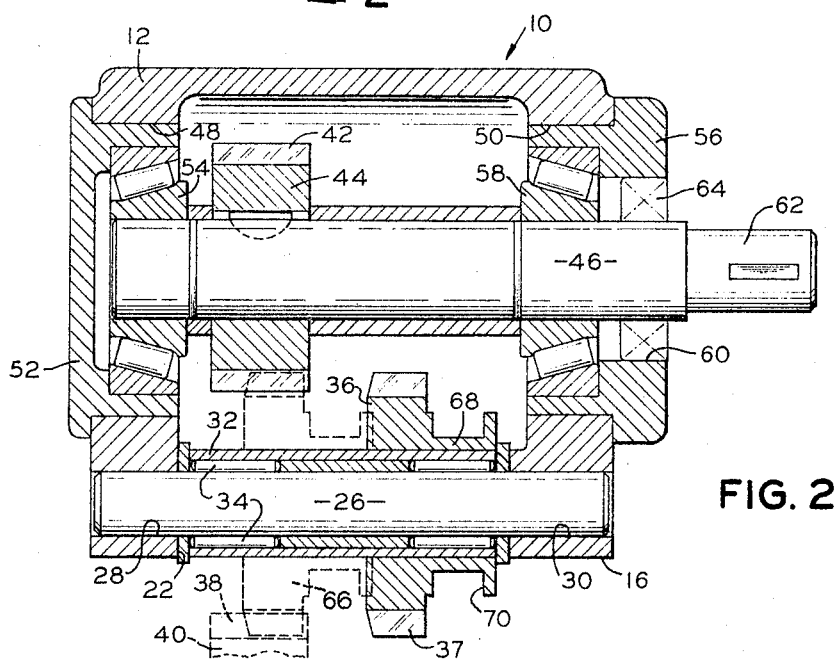
FIG. 2 is a view taken along the lines 2—2 in FIG. 1.

FIGS. 5–7 inclusive are partial side elevational views looking in the direction of the arrow A in FIG. 2, showing the shifting mechanism in a sequence of positions which occur during a shift.

In a preferred embodiment of this invention, the shifting mechanism is utilized with a power take-off unit having a shiftable gear therein. A shifting element is rotatably mounted in the case of the unit and adapted to shift the gear upon being rotated. A locking means is carried by the case and lockingly engage indexing openings in the shifting element. An actuating lever is also rotatably mounted in the case and is rotatable relative to the shifting element and includes portions which (a) cooperates with and maintains the locking means indexed with the openings, (b) upon initial rotary movement displaces the locking means from its indexed relationship, and (c) subsequent to the displacement movingly engages the shifting element to move it to an alternate position.

Referring to the drawings, a power take-off unit shown generally at 10 includes a housing or case 12 formed with a mounting flange 14 surrounding a lower face 16 thereof. The flange 14 is adapted to be secured to the case shown fragmentarily at 18 of a source of rotative power in the form of a main transmission by means of a plurality of bolts 20. The face is provided with a central opening 22 which registers with an opening 24 in the case 18.

A first shaft 26 is pressedly secured in a pair of aligned openings or bores 28 and 30 formed in the case 12 adjacent the face 16 and rotatably mounts an externally splined sleeve 32. A plurality of roller bearings 34 are positioned between the sleeve 32 and the shaft 26 to provide for substantially frictionless rotation therebetween.

A shiftable gear 36 is splined on the sleeve 32 and adapted for unitary rotation therewith while being axially movable therealong. The gear 36 is provided with peripheral gear teeth 37 which are operative to simultaneously drivingly engage the peripheral teeth 38 of a first gear 40 of the main transmission 18 and the peripheral gear teeth 42 of a second or output gear 44 securely mounted for unitary rotation on an output shaft 46; the latter being disposed in parallel space relationship with the shaft 26 and rotatably mounted in a pair of aligned openings or bores 48 and 50 formed in the case 12.

As seen in FIG. 2, a bearing cap 52 is suitably secured to the case 12 surrounding the bore 48 and carries therein a bearing assembly 54 which rotatably mounts the left end of the output shaft 46 in the case 12, while a second bearing cap 56 is suitably secured to the case 12 surrounding the bore 50 and carries between a bearing assembly 58 which rotatably mounts the right end of the shaft 46. The bearing cap 56 is provided with a central opening 60 through which the right end 62 of the shaft 46 extends, and sealing means shown generally at 64 are interposed therebetween. The right end 62 of the shaft 46 is suitably adapted to have torque transmitting means secured thereto and driven thereby.

With the shiftable gear 36 positioned as shown in full in FIG. 2, no torque will be transmitted to the power take-off unit 10 from the main transmission gear 40; however, upon being shifted or moved axially to the left to the position shown in phantom at 66, the shiftable gear 36 becomes drivingly connected to both the main transmission gear 40 and the output gear 44 and is operative to transmit torque therebetween. The shiftable gear 36 is provided with an elongated hub 68 which has a peripheral annular groove 70 therein adapted to be engaged by suitable means operative to move the gear axially.

What has been described to this point is a conventional power take-off unit having a shiftable member therein. However, for the purpose of this invention, it is understood that other units having a shiftable member therein may be adapted for use with a shifting mechanism which will now be described.

Means shown generally at 35 are provided to shift or move the shiftable gear 36 axially to its alternate positions as shown in FIG. 2 and to maintain the same in its alternate positions. More particularly, the case 12 is provided with a second opening 72 adjacent the shiftable gear 36. A mounting plate or cover 74 is rigidly secured to the case 12 by a plurality of bolts 76 and completely covers the opening 72. A boss 78 is formed centrally on the plate 74 and projects inwardly therefrom toward the shiftable gear 36 and terminates in a flat inner face 80. A shifting element 82 is rotatably mounted relative to the case 12 so that the case merely provides a stationary support therefor. The shifting element 82, as viewed in FIG. 3, has a pie-shaped upper portion 84 and a lever-shaped lower portion 86. An opening 88 is formed in the element 82 at approximately the apex of the pie-shaped portion, which opening rotatably receives an actuating shaft 90. The actuating shaft 90 is in turn rotatably mounted in an opening 92 formed centrally in the boss 78 and projects beyond the outer surface of the cover plate 74 where it terminates in a threaded end. The cover plate 74 has been provided for ease of assembling the shifting means in the case 12; however, the plate 74 may be eliminated and the shaft 90 mounted directly in the case.

Figure 1:
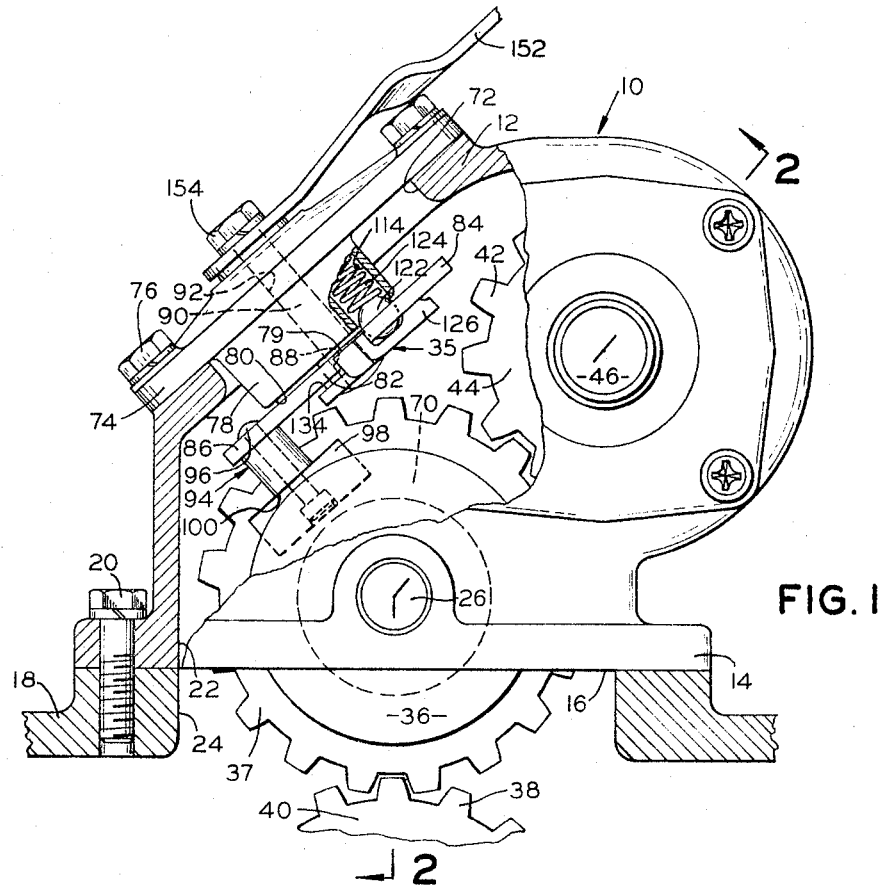
FIG. 1 is a side elevational view of a power take-off unit embodying the shifting mechanism of the present invention and having portions thereof broken away to more clearly show the relationship of the parts.

As seen in FIG. 1, the lower portion 86 of the shifting element 82 depends from the actuating shaft 90 and terminates slightly below a line drawn normally from the element to the center of the shiftable gear 36. A shouldered rivet 94 is rigidly secured as by riveting at its left end in an opening 96 formed adjacent the lower end thereof, and a block 98 is rotatably mounted on the right end of the rivet. The block 98 is slidingly disposed in the annular groove 70 formed in the shiftable gear 36 and engages the axial sides of the groove; the shoulder 100 on the rivet 94 serving as a spacer between the element 82 and the block 98 so as to properly position the latter in the groove.

To shift the shiftable gear 36 to the left, as seen in FIG. 2, the shifting element 82 is rotated clockwise about the actuating shaft 90 to a first position shown in FIG. 3. During this movement, the block 98 in the groove 70 carries the shiftable gear 36 to the left. Upon rotation of the shifting element 82 counterclockwise to a second position shown in FIG. 4, the block 98 in the groove 70 carries the shiftable gear 36 to the right.

Locking means are provided to lock the shifting element 82 in its first or second position. More particularly, the shifting element 82 is provided with a plurality of circumferentially spaced openings or indexing means 102, 104, 106 and 108 extending completely therethrough and disposed in the pie-shaped upper portion 84, with each opening being at an equal radial distance from the center of the opening 88 in the shifting element. The openings 102 and 104 are connected by an arcuate slot 110, while the openings 106 and 108 are connected by an arcuate slot 112; the slots 110 and 112 being formed about the center of the opening 88 and having an arc radius equal to the radial distance that the openings 102, 104, 106 and 108 are spaced from the center of the opening 88. The boss 78 is provided with a plurality of bores 114, 116, 118 and 120 which open at the inner face 80 of the boss 78 and have closed bottoms, which bores are displaced at an equal radial distance from the center of the opening 92 in the boss and which distance is the same as the radial distance the opening 102 is displaced from the opening 88 in the shifting element. Accordingly, upon rotation of the shifting element, the various openings therein will become successively superimposed over the various openings in the boss 78.

Locking means in the form of a ball 122 is shown disposed in the bore 114 in the boss 78 with a spring 124 disposed between the inner end of the ball and the closed end of the bores so that the ball is constantly biased out of the bore. In the position of the shifting element 82 as seen in FIGS. 3 and 5, the opening 102 in the shifting element is superimposed over the opening 114 in the boss 78 and receives the upper portion of the ball 122.

Means is provided (a) to retain the ball 122 from moving through the opening 102, (b) to urge the ball 122 out of the opening 102 and into the bore 114, and (c) to rotate the shifting element 82 about the actuating shaft 90. This means takes the form of a substantially pie-shaped actuating lever 126 having an opening 128 disposed therein adjacent the apex thereof, which opening receives the inner end of the actuating shaft 90 and is suitably secured thereto for unitary rotation as by rivetingly deforming the end of the shaft so that the shaft and the actuating lever are prepared for unitary rotation relative to the case 12 and relative to the shifting element 82; the shifting element serving as a spacer between the actuating level 126 and the face 80 of the boss 78.

The actuating lever 126 is superimposed over the pie-shaped portion 84 of the shifting element 82 and the arcuate extremities 130 and 132 thereof are preferably displaced radially from the center of the opening 128 therein a distance equal to the distance from the center of the opening 88 to the center of the opening 102 in the shifting element 82 so that the arcuate extremity 130 overlies the radially inner half of the opening 102. As clearly seen in FIGS. 3 and 5, the undersurface 134 of the actuating lever 126 at its arcuate extremity 130 is operative to engage and index the ball 122 disposed in the opening 102 and prevent the same from being biased therethrough by the spring 124 so that the undersurface is operative to maintain the above described locking engagement. In order to insure a locking relationship between the ball 122 and the shiftiing element 82, the distance indicated at D in FIG. 5 is maintained so at least half of the ball 122 is received within the opening 102 in the shifting element 82, so that as is well known, the shifting element is inoperative to cam the ball out of the opening 102 therein. To accomplish this, the shifting element 82, which acts as a spacer between the actuating lever 126 and the boss 78, and a centrally disposed raised bearing portion 79 of the boss 78 are formed with a combined thickness at least equal to the radius of the ball 122; the bearing portion 79 being provided as a spacer between the boss 78 and the shifting element 82. With the ball positioned thusly in opening 102, the shifting element 82 is not operative to cam the ball into the bore 114 so that gear hopping loads resulting from the shiftable gear 36 on the block 98 and the shifting element 82 cannot cause rotation of the latter. Further, since gear hopping loads are not imposed on the spring 124 it may be of relatively light construction and still operate satisfactorily.

The unlocking means carried by the actuating lever 126 is in the form of a double acting wedge-shaped cam element 136 which depends from the undersurface 134 of the actuating lever 126 with the apex 138 thereof extending through the slot 110 in the shifting element 82 and freely movable arcuately relative thereto. As seen in FIGS. 3 and 5, the left inclined surface 140 of the cam element 136 is disposed slightly to the right of the ball 122 so that, if the actuating lever is moved counterclockwise, the ball will be urged by the surface 140 of the cam element 136 into the bore 114 out of the opening 102. For the purpose of merely unlocking the ball 122 from the shifting element 82, the cam element need merely depend below the actuating lever 126 an amount sufficient to displace the center of the ball 122 below the lower surface of the shifting element 82, for then upon rotative movement of the shifting element, the latter will cooperate with the spherical surface of the ball to cam the latter out of the opening 102. However, to insure that the movement of the shifting element 82 can be accomplished with a minimum of effort, the cam element 136 is preferably formed to extend to the bottom of the slot 110 so that it coincides with the lower surface of the shifting element 82 and is operative to completely cam the ball out of the opening 102. In this manner, once the ball 122 is cammed out of the opening 102 there is no resistance presented by the ball to the rotative movement of the shifting element and the effort to cause movement thereof is substantially reduced from what the effort would be if the shifting element was required to cam the ball out of the opening while being rotated.

The means for rotating the shifting element 82 about the actuating shaft 90 takes the form of an actuating finger portion 142 of the actuating lever 126, which in cross section is L-shaped, having a main portion 144 extending radially from the pie-shaped portion of the actuating lever and an engaging portion 146 which depends from the main portion 144 into a circumferentially elongated slot 148 in the shifting element 82. The slot 148 is of greater circumferential width than the width of the engaging portion 146 so that, as viewed in FIG. 3, upon counterclockwise rotation of the actuating lever 82 the cam element 136 will be moved to the uppermost portion of the ball 122 and have completely displaced the latter from the opening 102, as shown in FIG. 6, before or at least simultaneously with the left side of the engaging portion engaging the left side of the slot 148. At this time, further counterclockwise rotation of the actuating lever 126 will result in counterclockwise shifting rotation of the shifting element 82 which in turn will move the siftable gear 36 to its position shown in full lines in FIG. 2. Accordingly, the extra width of the slot 148 serves as a lost motion arrangement between the actuating lever 126 and the shifting element 82. With this arrangement, the device herein described is extremely easy to shift in that the effort for displacing the locking device 122 from its locking engagement with the shifting element 82 is overcome first and separately from the effort which must be expended to cause shifting of the shiftable element; and, as a result, these forces are separately applied and are not additive in nature. Further, since both the actuating lever 126 and the shifting element move arcuately, there is no component of force lost when such urging takes place nor any tendency to bind as there is in the device shown in United States Patent No. 2,933,928.

The width of the cam element 136 need only be great enough to allow movement of the shiftable element 82 to a position wherein the opening 102 therein is displaced counterclockwise a distance equal to the radius of the ball 122, for at that time, the ball is no longer operative to enter and engage the opening 102 and is maintained depressed in the bore 114 by its engagement with the undersurface of the shifting element 82, and the latter may freely rotate counterclockwise until such time as the next opening 104 becomes aligned with the ball 122. At this time, the ball will enter the opening 104 in an overcenter relationship and securely lock the shifting element 82 in its second position as shown in FIGS. 4 and 7; the undersurface 134 to the right of the cam element 136 now engaging the ball and maintaining the same in the opening 104 so that in effect the undersurface 134 has two spaced abutting portions.

To return the shifting element 82 to its first position, the actuating lever 126 is rotated clockwise. During the first increment of movement, the right incline surface 150 of the cam element 136 engages the ball 122 and depresses the same into the bore 114 and out of the opening 104. During this initial movement, the actuating finger is moved in a lost motion relationship relative to the slot 148. When the ball 122 is fully depressed, as shown in FIG. 6, and the engaging portion 146 of the actuating lever 126 engages the right side of the slot 148, further clockwise movement of the actuating lever carries the shifting element 82 clockwise therewith to its first position, the latter carrying the shiftable gear 36 to its position shown in phantom at 66 in FIG. 2.

It should be noted that in the above described shifting action the openings 106 and 108 in the shifting element 82 and the openings 116, 118 and 120 in the boss 78 have not been utilized. These openings have been shown to indicate how simple it is to alter the shifting pattern of this device. For example, the ball 122 can be inserted in the opening 116 and the openings 106 and 108 in the shifting element 82 utilized to cooperate therewith. In this manner, if the shiftable gear 36 was desired to be moved to the left from its phantom position 66, instead of to the right as previously described, such could be actuated by this described arrangement of parts. Further, if the internal structure of the unit to be shifted does not allow the clearance for the pie-shaped portion 84 of the shifting element 82 and the actuating lever 126 to project upwardly as shown in FIG. 3, their position can be altered so that one of the openings 118 or 120 in the boss is utilized therewith so that the shifting element and actuating lever would now project downwardly instead of upwardly. This versatility is easily afforded without having to change the mounting position of the shaft 90 as a result of the rotary action of both the shifting element and the actuating lever and cannot be obtained by prior art devices.

Means have been provided to rotate the actuating lever relative to the case 12. This takes the form of a control lever 152 which is mounted for unitary rotation on the outer end of the shaft 90 and secured thereto by a nut 154 threaded on the end of the shaft. The control lever 152 may be grasped by hand and directly manually operated, or a suitable linkage (not shown) may be provided between the control lever and a remote location. It is apparent that other means may be inserted through a suitable aperture in the case 12 and engage the actuating lever 126 to rotate the same relative to the case 12.

From the foregoing it is readily apparent that a device has been described which results in an easy shifting operation of a shiftable member, wherein the shiftable member is securely locked in its desired position; wherein the device to be shifted is first unlocked from its locked position prior to the actual shifting operation so that the unlocking and shifting operation take place consecutively rather than simultaneously; wherein a single element is operable to maintain the shiftable in its locked position, and is further operable to unlock the shiftable element and shift the latter; and wherein the other objects previously set forth above are fully fulfilled.

While only a single embodiment of this invention has been shown and described, it is readily apparent that many changes can be made therein without departing from the scope of this invention as defined by the following claims.

What is claimed is:

1. A shifting mechanism operative to impose a shifting force upon a shiftable member having first and second positions comprising in combination,
    (a) a support means disposed in a stationary position relative to the shiftable member,
    (b) a shifting element engageable with the shiftable member and operative to induce a shifting force thereto,
    (c) said shifting element having first and second positions corresponding to first and second positions of said shiftable member and being rotatable between said first and second positions,
    (d) locking means carried by said support means and engageable with said shifting element in its first and second positions for locking the latter alternately in said positions,
    (e) an actuating means,
        (1) for maintaining said locking means in locking engagement with said shifting element,
        (2) for urging said locking means out of locking engagement with said shifting element,
        (3) for rotating said shifting element to its first and second positions,
    (f) said actuating means being engageable with said locking means and said shifting element,
    (g) and means carried by said support means and mounting said shifting element and said actuating means for rotational movement relative to each other and relative to said support means.

2. A shifting mechanism operative to impose a shifting force upon a shiftable member having first and second positions comprising in combination,
    (a) a support means disposed in a stationary position relative to the shiftable member,
    (b) a shifting element engageable with the shiftable member and operative to induce a shifting force thereto,
    (c) said shifting element having first and second positions corresponding to first and second positions of said shiftable member and being rotatable between said first and second positions,
    (d) locking means carried by said support means and engageable with said shifting element in its first and second positions for locking the latter alternately in said positions,
    (e) an actuating means
        (1) for maintaining said locking means in locking engagement with said shifting element,
        (2) for urging said locking means out of locking engagement with said shifting element,
        (3) for rotating said shifting element to its first and second positions,
    (f) means carried by said support means and mounting said shifting element and said actuating means for rotational movement relative to each other and relative to said support means,
    (g) a lost motion means connecting said actuating means and said shifting element whereby lost motion relative movement may occur therebetween before the engagement thereof,
    (h) said actuating means being engageable with and operative to urge the locking means out of locking engagement with said shifting element while moving relative thereto and engaging said shifting element and operative to rotate the same after such urging of said locking means.

3. In a gear shifting mechanism the combination comprising,
    (a) a relatively stationary support means,
    (b) a rotatable shifting element having indexing means thereon,
    (c) locking means carried by said support means and lockable with said indexing means to prevent movement of said shifting element,
    (d) a rotatable actuating means engageable with said locking means,
    (e) means mounting said shifting element and actuating means for rotation relative to said support means and to each other,
    (f) means forming a lost motion connection between said shifting element and said actuating means whereby limited relative rotation may occur therebetween,
    (g) unlocking means carried by said actuating means and rotatable unitarily therewith and operative to unlock the locking means from said shifting element upon lost motion relative rotation between said actuating means and said shifting element,
    (h) and said lost motion means comprising engaging means carried by said actuating means and unitarily rotatable therewith and engageable with said shifting element after lost motion rotative movement therebetween,
    (i) whereby said actuating means is rotated relative to said shifting element to unlock said locking means therefrom and further rotation of the former induces rotation of the latter by the action of said engaging means.

4. The mechanism defined in claim 3 wherein said actuating means and said shifting element are rotatable about a common axis.

5. The mechanism defined in claim 4 wherein said mounting means is a single member rotatably mounting both said actuating means and said shifting element.

6. In a gear shifting mechanism the combination comprising
   (a) a relatively stationary support means,
   (b) a rotatable shifting element having a first and a second spaced indexing means thereon,
   (c) a locking element carried by said support means and alternately lockable with said first and second indexing means to prevent rotation of said shifting element,
   (d) a rotatable actuating means,
   (e) means mounting said shifting element and actuating means for rotation relative to said support means, to said locking means, and to each other,
   (f) means forming a lost motion connection between said shifting element and said actuating means whereby limited relative rotation may occur therebetween,
   (g) said actuating means carrying for unitary rotation
      (1) a portion engageable with said locking element for maintaining the latter in a locked relationship with said indexing means,
      (2) unlocking means engageable with said locking means upon movement of said actuating means relative thereto and being operative to unlock said locking means from said shifting element upon lost motion relative rotation between said actuating means and said shifting element,
      (3) and said lost motion means comprising engaging means carried by said actuating means and unitarily rotatable therewith and engageable with said shifting element after lost motion rotative movement therebetween,
   (h) whereby said actuating means is rotated relative to said shifting element to unlock said locking means therefrom and further rotation of the former induces rotation of the latter by the action of said engaging means.

7. In a gear shifting mechanism the combination comprising
   (a) a relatively stationary support means,
   (b) a rotatable shifting element having a first and a second spaced indexing opening therethrough,
   (c) a locking means carried by said support means,
   (d) said shifting element being rotatable between a first and a second position,
      (1) in said first position said first opening becoming aligned with and lockingly receiving said locking means and
      (2) in said second position said second opening becoming aligned with and lockingly receiving said locking means,
   (e) a rotatable actuating means,
   (f) means mounting said shifting element and actuating means for rotation relative to said supporting means, to said locking means and to each other,
   (g) means forming a lost motion connection between said shifting element and said actuating means whereby limited relative rotation may occur therebetween,
   (h) said actuating means carrying for unitary rotation therewith
      (1) a first and a second maintaining portion engageable with said locking means when the latter is received in said first and second opening respectively for maintaining said locking means in said openings,
      (2) unlocking means engageable with said locking means upon movement of said actuating means relative thereto and being operative to move said locking means out of said opening receiving the same upon lost motion relative rotation between said actuating means and said shifting element,
      (3) and said lost motion means comprising engaging means carried by said actuating means and unitarily rotatable therewith and engageable with said shifting element after lost motion rotative movement therebetween,
   (i) whereby said actuating means is rotated relative to said shifting element to unlock said locking means therefrom and further rotation of the former induces rotation of the latter by action of said engaging means.

8. The gear shifting mechanism defined in claim 7 wherein said actuating means and said shifting element are rotatable about a common axis.

9. The mechanism defined in claim 8 wherein said mounting means is a single member rotatably mounting both said actuating means and said shifting element.

10. The mechanism defined in claim 9 wherein said actuating means is mounted on said single member for unitary rotation therewith whereby movement of said single member induces corresponding movement of said actuating means.

11. The shifting mechanism defined in claim 7 wherein said first and second maintaining portions are arcuately spaced from each other and said unlocking means is disposed therebetween.

12. The mechanism defined in claim 7 wherein said first and second space indexing openings are connected by a slot means, said unlocking means is disposed between said first and second maintaining portions and projects into said first and second openings, and operable to pass therebetween through said slot means.

13. In a gear shift mechanism the combination comprising,
   (a) a rotatable shift element having associated therewith
      (1) a plurality of index openings for determining the different operative positions of said shift element, and
      (2) a slot portion
   (b) locking means adapted for releasable engagement with said index openings for preventing movement of said shift element upon indexing of said locking means with either of said index openings,
   (c) an actuating member operatively connected to said shift element and having
      (1) spaced overlapping portions for maintaining said locking means in an indexed position,
      (2) cam means thereon communicating with said index opening for releasing said locking means therefrom and
      (3) engaging means carried thereby operable to effect rotation of said shift element upon releasing of said locking means,
   (d) said engaging means disposed in said slot portion but normally spaced from engagement therewith and thereby defining a lost motion connection between said shift element and said actuating member,
   (e) whereby during rotation of said actuating member said cam means will be operable to release said locking means prior to engagement of said engaging means becoming operative to cause rotation of said shift element to effect shifting of the shiftable member to another shifted position.

14. In a shift mechanism, the combination comprising,
   (a) a rotatable shift element having associated therewith
      (1) a pair of spaced index openings and a cutaway portion interconnecting the same and
      (2) a circumferentially elongated slot, (b) locking means releasably engageable with either of said index openings for locking the shift element from rotation,
(c) an actuating member adapted to be connected to said shift element and including
   (1) means thereon for retaining said locking means in either of said index openings while said shift element is in a preselected position,
   (2) cam means extending into said index openings and movable therebtween through said cut-away portion for releasing said locking means to permit rotation of said shift element,
   (3) engaging means engageable with said slot for effecting rotation of said shift element but being normally spaced from engagement therewith,
(d) a single member for mounting said actuating member for unitary rotation therewith and said shif element for rotation relative thereto,
(e) so that said cam means on said actuating member will be operative to release said locking means prior to effecting rotation of said shift element by said engaging means.

15. A gear shifting mechanism for connection to a stationary case having a shiftable gear disposed therein adapted for shifting between an engaged and a disengaged position, comprising
(a) a mounting plate fixedly secured to the housing adjacent the shiftable gear,
(b) a shifting element rotatable between a first and a second operative position and having an enlarged upper portion and an elongated lower portion,
   (1) said upper portion provided with a circumferential elongated slot and
   (2) indexing means in the form of a first and a second opening connected by an arcuate slot for determining said first and second operative positions thereof and arranged to correspond to the engaged and disengaged positions of the shiftable gear,
   (3) a shifter block carried by said lower portion for connection to the shiftable gear being operative upon rotation of said shifting element between its operative positions to effect simultaneous shifting of the shiftable gear between its engaged and disengaged positions,
(c) a spring loaded locking ball carried by said mounting plate and alternately engageable within said first and second index openings for preventing rotation of said shifting element while in a pre-selected position and thereby enabling the shiftable gear to be maintained in a shifted position,
(d) a rotatable actuating lever disposed over said shifting element and having integral therewith
   (1) spaced overlapping portions engageable with at least a portion of said ball for maintaining the same in a locked position when said shift element is in an operative position,
   (2) a cam means between said overlapping portions depending therefrom into cooperative engagement with said first and second index openings and movable therebetween through said arcuate slot upon movement of said actuating lever relative to said shift element to release said ball from locking engagement with said shift element to permit rotation thereof to its other operative position,
   (3) a radially extending finger having an outer engaging portion thereon depending into cooperative engagement with said circumferentially elongated slot normally spaced from engagement therewith but engageable thereby upon limited relative movement to effect unitary rotation of said shift element by said actuating lever,
(e) a shaft journaled in said mounting plate for mounting said shifting element and said actuating lever about a common axis for rotation relative to said mounting plate,
(f) said actuating lever being rigidly connected to one end of said shaft while said shift element is freely rotatable relative thereto so as to permit limited rotary movement of said shift element with respect to said actuating lever,
(g) a manually operable control lever rigidly connected to the other end of said shaft for rotating said shaft and said actuating member relative to said mounting plate,
(h) whereby during initial rotary movement of said control lever said actuating lever is rotated relative to said shift element to unlock said ball therefrom and upon further rotary movement of said control lever will cause unitary rotation of said shifting element and said actuating lever by means of said engaging portion to effect shifting of the shiftable gear to an alternate position.

No references cited.

MILTON KAUFMAN, *Primary Examiner*.